United States Patent [19]

Okada et al.

[11] Patent Number: 4,865,119

[45] Date of Patent: Sep. 12, 1989

[54] AIR CONDITIONER SYSTEM FOR AUTOMOTIVE VEHICLES

[75] Inventors: Tsugihiro Okada; Eiichi Ohtsu; Tetsuho Yokoyama, all of Katsuta, Japan

[73] Assignee: Hitachi, Ltd., Tokyo, Japan

[21] Appl. No.: 9,480

[22] Filed: Feb. 2, 1987

[30] Foreign Application Priority Data

Feb. 4, 1986 [JP] Japan .................................. 61-21192

[51] Int. Cl.[4] ............................................. F25B 29/00
[52] U.S. Cl. ......................................... 165/16; 165/30; 165/43; 236/91 F
[58] Field of Search ....................... 165/16, 42, 43, 30, 165/11.1; 236/91 F

[56] References Cited

U.S. PATENT DOCUMENTS

| | | | |
|---|---|---|---|
| 4,311,188 | 1/1982 | Kojima et al. | 165/43 |
| 4,323,111 | 4/1982 | Iijima | 165/25 |
| 4,337,818 | 7/1982 | Franz | 165/43 |
| 4,354,547 | 10/1982 | Sugiura | 165/25 |
| 4,375,754 | 3/1983 | Okura | 165/43 |
| 4,407,446 | 10/1983 | Iijima et al. | 165/16 |
| 4,408,713 | 10/1983 | Iijima et al. | 165/16 |
| 4,416,324 | 11/1983 | Sutoh et al. | 165/16 |
| 4,417,618 | 11/1983 | Yoshimi et al. | 165/16 |
| 4,460,035 | 7/1984 | Mizote et al. | 165/16 |
| 4,466,480 | 8/1984 | Ito et al. | 165/43 |
| 4,476,919 | 10/1984 | Akimoto et al. | 165/42 |
| 4,478,274 | 10/1984 | Naganoma et al. | 165/42 |
| 4,481,789 | 11/1984 | Akimoto et al. | 236/91 F |
| 4,484,619 | 11/1984 | Franz | 165/42 |
| 4,498,309 | 2/1985 | Kobayashi et al. | 98/2.01 |

FOREIGN PATENT DOCUMENTS

| | | | |
|---|---|---|---|
| 53-34371 | 9/1978 | Japan . | |
| 55-36166 | 3/1980 | Japan . | |
| 56-71618 | 6/1981 | Japan . | |
| 58-156410 | 9/1983 | Japan . | |
| 0001014 | 1/1985 | Japan | 165/16 |
| 0076416 | 4/1985 | Japan | 165/11.1 |

Primary Examiner—John Ford
Attorney, Agent, or Firm—Antonelli, Terry & Wands

[57] ABSTRACT

An air conditioner system for an automotive vehicle includes air cooling means, air heating means arranged downstream of the air cooling means, a bypass air passage bypassing the air heating means, means for detecting the temperature of intake air immediately before passing through the air cooling means, and means for comparing the intake air temperature detected by the intake air temperature detecting means and a desired temperature. The amount of air flow through the bypass air passage is controlled when the intake air temperature is lower than the desired temperature by a first predetermined deviation value, and the amount of air flow through the bypass air passage is controlled at the maximum value when the intake air temperature is greater than the desired temperature value by a second predetermined deviation value. The compressor is actuated when the intake air temperature is larger than the desired air temperature. The compressor is not actuated when the intake air temperature is smaller than the desired air temperature.

4 Claims, 6 Drawing Sheets

AIR CONDITIONER SYSTEM FOR AUTOMOTIVE VEHICLES

BACKGROUND OF THE INVENTION

The present invention relates to an air conditioner system of the type including air cooling means and air heating means and capable of maintaining any given temperature within a given space and more particularly to an air conditioner system well suited for installation on automotive vehicles.

The automobile air conditioner systems used in the early days employed a cooler and a heater separately. Later, air conditioner systems of the type in which the cooler and heater were controlled as a unit to satisfactorily control the temperature within the vehicle compartment at a constant value against a wide range of outside air temperatures, that is, the so-called reheat air mixing type came into use. Since the reheat air mixing type, is advantageous in that it is excellent in the continuity of temperature control and it also serves a dehumidifying function, air conditioner systems of this type have come into wide use.

One such automobile air conditioner system of the reheat air mixing type is disclosed for example in Japanese Unexamined Publication No. 55-36166. In this prior art system, the operating range of a refrigerant compressor is so wide that as for example, the compressor or cooling means is operated even until the outside air in temperature is so low the vehicle compartment would not be uncomfortable without any cooling and dehumidification.

In this connection, 80% of the power required for the operation of this type of air conditioner system is consumed in driving the cooling means or the refrigerant compressor.

Thus, this type of conventional air conditioner system is disadvantageous from the energy saving point of view in that an unnecessarily large amount of engine power is consumed when considered in terms of the whole year.

On the other hand, another type of automobile air conditioner system is disclosed in Japanese Unexamined Publication No. 58-156410, for example. With the automobile air conditioner system disclosed in this publication, however, as will be described later in detail, no consideration is given to the temperature of the intake air before the heat exchanging stage and therefore there is a disadvantage that the heat exchanging characteristic fails to become monotonic at the boundary between cooling and heating of the air so that the automatic control of the vehicle compartment temperature to the desired temperature is deteriorated in convergence and a considerable time is required prior to reaching a steady-state condition.

Another example of the prior art is disclosed in U.S. Pat. No. 4,416,324. However, this air conditioner system still leaves room for improvement in energy saving in that even though the desired discharged air temperature of the cooling means is shifted to an upper level when the heating means comes into operation, the cooling means is also in operation.

Other prior art literatures include U.S. Pat. Nos. 4,337,818; 4,311,188; 4,408,713; 4,460,035; 4,416,324; 4,466,480; 4,417,618; 4,375,754; 4,407,446; 4,354,547; 4,323,111; and 4,498,309; and Japanese Patent Nos. 34371 and 71618.

SUMMARY OF THE INVENTION

It is an object of the present invention to provide an air conditioner system for automotive vehicles which overcomes the foregoing deficiencies in the prior art and is capable of satisfactorily reducing the amount of wasteful energy consumption and ensuring excellent convergence (comparable to the prior art).

To accomplish the above object, in accordance with the invention there is thus provided an air conditioner system of the reheat air mixing type which is designed so that the temperature of the air flowing into cooling means is taken into consideration to accomplish smooth changeover between the functions of the cooling and heating means and thereby ensure a monotonic heat changing characteristic.

By reflecting the changeover to the operation of the heating means when the desired discharged air temperature of the cooling means becomes substantially equal to its intake air temperature, it is possible to avoid any useless operation of the cooling means and effect the changeover from the cooling means to the heating means smoothly.

DESCRIPTION OF THE PREFERRED EMBODIMENTS

An automobile air conditioner system according to the invention will now be described in detail with reference to the illustrated embodiments.

Figure 1:
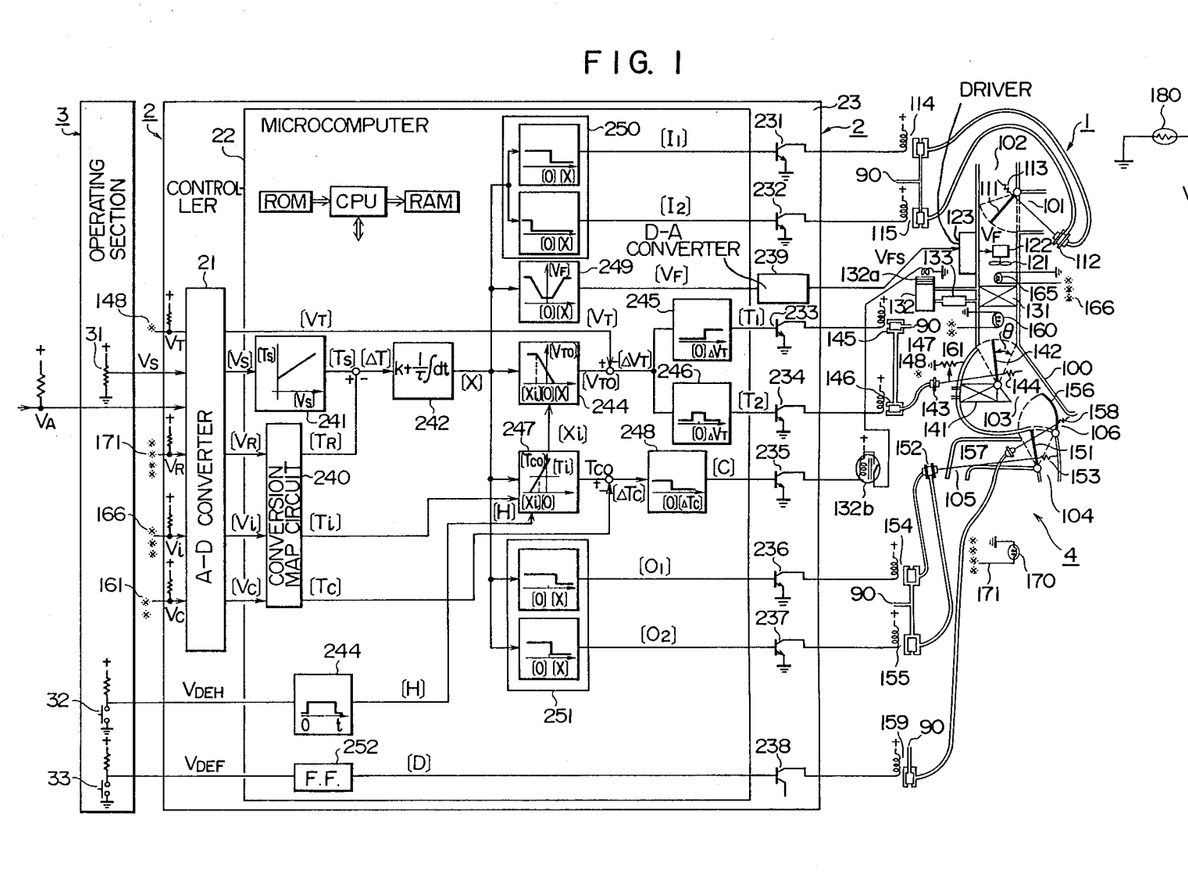
FIG. 1 shows the overall construction of an embodiment of the present invention.

Referring now to FIG. 1 illustrating the first embodiment of the invention, numeral 1 designates a heat exchanging section as a whole and the heat exchanging section 1 includes an outside air inlet 101 for drawing the air from the outside of the vehicle compartment, an inside air inlet 102 for drawing the vehicle compartment air and an air inlet door 111 for controlling the opening and closing of the air inlets 101 and 102. The air inlet door 111 is selectively controlled to its three positions by a double-action vacuum actuator 112 and a return spring 113. More specifically, the vacuum working chambers of the vacuum actuator 112 are respectively connected to a negative pressure source 90 (not shown) through electromagnetic valves 114 and 115 so that when both of the electromagnetic valves 114 and 115 are not energized, the air inlet door 111 is caused by the force of the return spring 113 to close the inside air inlet 102 and thereby draw the outside air, whereas when both of the electromagnetic valves 114 and 115 are energized, in response to the negative pressure supplied to the two vacuum working chambers of the vacuum actuator 112 the outside air inlet 101 is closed thereby drawing the inside air. Also, when the electromagnetic valve 114 is energized and the electromagnetic valve 115 is deenergized, the negative pressure is supplied only to one of the vacuum working chambers of the vacuum actuator 112 so that the air inlet door 111 is stopped at the illustrated position which is, intermediate the previously mentioned conditions and both the outside air inlet 101 and the inside air inlet 102 are opened, for drawing both the inside and outside air.

Disposed inside a heat exchanging section unit case 100 is a blower 121 for drawing the air from the air inlets and supplying the air to the heat exchanging section which will be described later. The amount of air flow by the blower 121 is controlled by controlling the applied voltage supplied to a motor 122 by a driver 123 under the control of a controller 2.

An evaporator 131 is arranged downstream of the blower 121 and the evaporator 131 provides, along with a compressor 132, an expansion valve 133, etc., a compression refrigeration cycle. The evaporator 131, forms cooling means for the air flowing through it.

The compressor 132 is driven through an electromagnetic clutch 132a by the vehicle engine which is not shown and its on and off operations are effected by energizing and deenergizing the electromagnetic clutch 132a through a compressor relay 132b which is controlled by the control signals from the controller 2.

A heater core 141 forming heating means is also disposed downstream of the evaporator 131 and the engine cooling water (hot water) of the vehicle is circulated through the heater core 141, thereby heating the air passed through the heater core 141. A temperature adjusting door 142 is provided to control the amount of heat application by varying the amount of air flow through the heater core 141. The temperature adjusting door 142 is pivoted by a vacuum actuator 143 connected to the negative pressure source 90 through electromagnetic valves 145 and 146 and a return spring 144. When both of the electromagnetic valves 145 and 146 are not energized, the vacuum working chamber of the vacuum actuator 143 is connected to the atmosphere through the electromagnetic valves 145 and 146 so that no negative pressure is applied and the temperature adjusting door 142 is pivoted by the return spring 144 in the direction tending to decrease the angle $\theta$ in FIG. 1, thereby increasing the amount of air flow through the heater core 141. When the electromagnetic valve 145 is energized and the electromagnetic valve 146 is deenergized, the vacuum working chamber of the vacuum actuator 143 is connected to the negative pressure source 90 through the electromagnetic valves 146 and 145 and the negative pressure is applied. As a result, the temperature adjusting door 142 is pivoted in the direction which increases the angle 8 against the force of the return spring 144. In other words, the adjusting door 142 is operated in the direction which decreases the amount of air flow through the heater core 141. A potentiometer 147 is operable in association with the temperature adjusting door 142 so that a position signal corresponding to the position of the temperature adjusting door 142 is applied in the form of a voltage $V_T$ to an input 148 of the controller 2 and the value of $V_T$ is increased with increase in the angle $\theta$.

The temperature adjusting door 142 is feedback controlled by the above-described construction so that the amount of air flow through the heater core 141 is controlled in the range between 0% ($\theta$ is maximum) and 100% ($\theta$ is zero) of the blower air flow A supplied by the blower 121. On the other hand, the air bypassing the heater core 141 is passed through a bypass 103 arranged in parallel to the heater core 141 so that it is mixed with the air heated through the heater core 141 and the mixed air is supplied into the vehicle compartment.

The air passed through the evaporator 131 and the heater core 141 or the bypass 103 is blown into the vehicle compartment through a top discharge outlet 104 or a bottom discharge outlet 105 for the vehicle compartment or a discharge outlet 106 for the windshield glass.

A mode door 151 is provided to selectively open the air discharge outlets for the vehicle compartment and the mode door 151 is selectively controlled to its three positions by a double-action vacuum actuator 152 in the like manner as the air inlet door 111. The vacuum actuator 152 has two vacuum working chambers which are respectively connected through electromagnetic valves 154 and 155 to the negative pressure source 90. Thus, when both of the electromagnetic valves 154 and 155 are not energized, the top discharge outlet 104 is closed by a return spring 153 and the air is discharged through the bottom discharge outlet 105. When both of the electromagnetic valves 154 and 155 are energized, the negative pressure source 90 is connected to the vacuum working chambers of the vacuum actuator 152 so that the mode door 151 closes the bottom discharge outlet 105 and the air is discharged through the top discharge outlet 104. When the electromagnetic valve 154 is energized and the electromagnetic valve 155 is deenergized, only one of the vacuum working chambers of the vacuum actuator 152 is connected to the negative pressure source 90 and the mode door 151 is moved to the position shown which is intermediate the previously mentioned conditions. Thus, both of the top and bottom discharge outlets 104 and 105 are opened and the air is discharged through the two outlets, thereby attaining a so-called high-level condition. The air discharge outlet 106 for the windshield glass is opened and closed by a door 156. It is usually so constructed that there is a small amount of discharged air even when the door 156 is closed.

The door 156 is the so-called defroster door and it is operated by a vacuum actuator 157 connected to the negative pressure source 90 through an electromagnetic valve 159 and a return spring 158. When the electromagnetic valve 159 is energized, the negative pressure is applied to the vacuum actuator 157 and the defroster door 156 is opened against the return spring 158. When the electromagnetic valve 159 is deenergized, the door 156 is closed by the return spring 158.

Disposed immediately downstream of the evaporator 131 is a discharged air temperature sensor 160 comprising a thermister to detect the temperature of the air just emerging from the evaporator 131 or discharged air temperature $T_C$ and the discharged air temperature $T_C$ is supplied in the form of a voltage $V_C$ to an input 161 of the controller 2.

In addition, an intake air temperature sensor 165 comprising a thermistor is arranged upstream of the evaporator 131 to detect the temperature of the air prior to its passage through the evaporator 131 or intake air temperature $T_i$ and the intake air temperature $T_i$ is supplied in the form of a voltage $V_i$ to an input 166 of the controller 2.

On the other hand, a vehicle compartment temperature sensor 170 is mounted in a suitable position inside the vehicle compartment to supply a vehicle compartment temperature $T_R$ in the form of a voltage $V_R$ to an input 171 of the controller 2.

The controller 2 includes an A/D converter 21 for converting the analog signals from the previously mentioned sensors and an operating section 3 to digital signals, a microcomputer 22 for performing computational operations on the digital signals from the A/D converter 21 and the operating section 3 and an interface circuit 23 responsive to the output signals of the microcomputer 22 to control the various devices in the heat exchanging section 1. The interface circuit 23 includes transistors 231 to 238 serving as switching elements for controlling the electromagnetic valves 114, 115, 145, 146, 154, 155 and 159 and the compressor relay 132b in the heat exchanging section 1, and a D/A converter 239 for supplying an analog voltage to the driver 123 which supplies an electric power to the motor 122.

The operating section 3 includes an air conditioner switch (not shown) for turning on and off the present system, temperature setting means 31 for presetting the vehicle compartment to the desired temperature, a dehumidification switch 32 for manually dehumidifying the vehicle compartment, a switch 33 operable so as to blow the air toward the windshield glass from the discharge outlet 106, etc. The desired compartment temperature (desired preset temperature $T_S$) preset by the temperature setting means 31 is applied as a voltage $V_S$ to the controller 2 and the output signals $V_{DEH}$ and $V_{DEF}$ of the dehumidification switch 32 and the switch 33 are also applied in the form of voltages to the controller 2.

With the construction described above, the operation of the automobile air conditioner system according to the invention will now be described.

Figure 2:
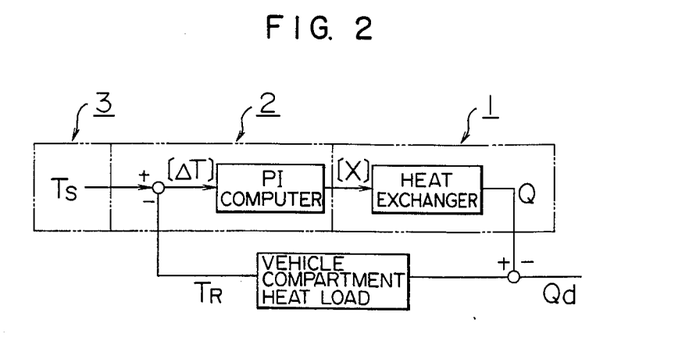
FIG. 2 is a functional block diagram for explaining the principle of an automatic temperature control system including the invention.

FIG. 2 illustrates the principle of an automatic temperature control employed by the present embodiment. The desired preset temperature $T_S$ preset by the setting means 31 of the operating section 3 and the vehicle compartment temperature $T_R$ detected by the sensor 170 which will be described later are compared and the resulting temperature difference $\Delta T = T_S - T_R$ is subjected to PI computation (proportional plus integral computation).

In this case, if the result of the PI computation is represented by X, the following equation holds.

$$X = k_1 \cdot \Delta T + k_2 \cdot \int \Delta T dt$$

The PI computation is the procedure which has been generally used in the field of automatic control. Thus, as will be seen from the above equation, the result is divided into the proportional portion and time integral portion of the difference between the desired condition and the actual controlled variable and the required quantity for changing the controlled variable to the desired condition is computed from these portions In this way, the controller 2 controls the heat exchanging section 1 in such a manner that a heat quantity Q proportional to the value of the computation result X is supplied into the vehicle compartment 4. At this time, the vehicle compartment air (heat load) receives a disturbance heat $Q_D$ in addition to the heat quantity Q. It is to be noted that the disturbance heat $Q_D$ includes the infiltration heat from the outside of the compartment, the radiant heat of the sun, the transmitted heat from the engine room and the radiation of heat from the occupants.

The vehicle compartment air receives the heat quantity $Q + Q_D$ and the vehicle compartment temperature $T_R$ is varied with a first-order lag. This vehicle compartment temperature $T_R$ is negatively fed back to the controller 2. With this negative feedback control system, it is proved mathematically that the vehicle compartment temperature $T_R$ is stably adjusted to the desired preset value if the coefficients of the various elements are proper and thus the automatic temperature control is accomplished.

With the embodiment of this invention, the above-mentioned temperature control is performed in the following way.

Figure 3:
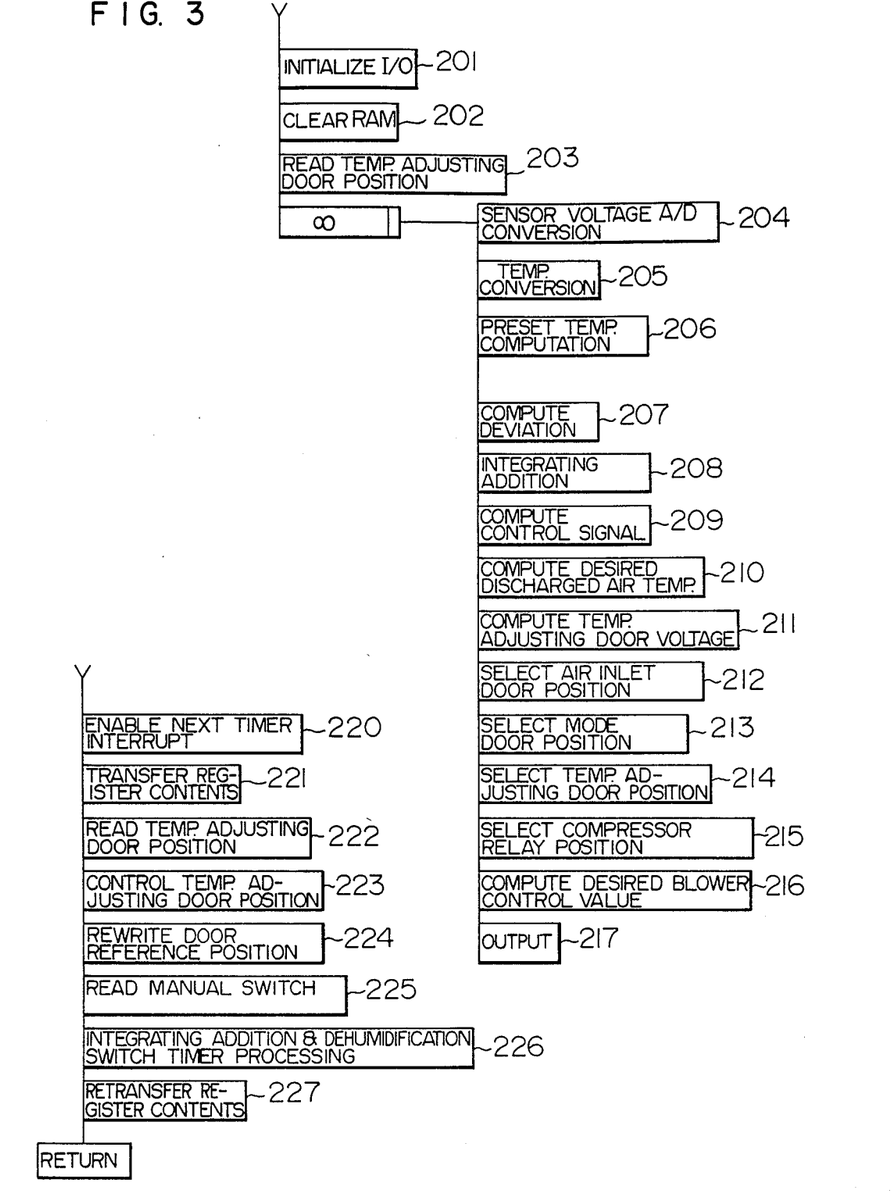
FIG. 3 is a flow chart for explaining the operation of the embodiment of the invention.

FIG. 3 is an operational flow chart for the microcomputer program of the controller 2 and the numerals in the Figure are step numbers indicating the sequence of the flow. As shown in the Figure, the operation of the system comprises an initialize routine including steps 201 to 203, a main routine which repeats steps 204 to 217 for an indefinite number of times and an interrupt routine which performs steps 220 to 227 at a period which is one/several hundredths (one hundredth in this embodiment) of one period of the main routine (about 1 second in this embodiment) during the execution of the main routine.

Firstly, when the system is started by the air conditioner switch, in the microcomputer 22 of the controller 2 the I/O data are set to the predetermined initial values at the step 201 and the RAM (not-shown) is cleared at the step 202. Then, at the step 203, the voltage $V_T$ generated from the potentiometer 147 and corresponding to the position ($\theta = 0$) of the temperature adjusting door 142 is converted to a digital value $V_T$ by the A/D converter 21 and it is read as a door reference position initial value. It is to be noted that the door reference position signal is monitored and renewed by the interrupt routine at the step 224.

At the step 204, the voltage $V_S$ corresponding to the desired temperature $T_S$ set by the operating section 3, the voltage $V_R$ corresponding to the vehicle compartment temperature $T_R$, the voltage $V_C$ corresponding to the discharged air temperature $T_C$ and the voltage $V_i$ corresponding to the intake air temperature $T_i$ are respectively converted to digital values $V_S$, $V_R$, $V_C$ and $V_i$ by the A/D converter 21 and supplied to the microcomputer 22.

The voltage $V_T$ corresponding to the position of the temperature adjusting door 142 is read in response to a timer interruption as will be described later.

Then, at the step 205, the digital values $V_R$, $V_C$ and $V_i$ are respectively converted to digital values $T_R$, $T_C$ and $T_i$ corresponding to the vehicle compartment temperature, the discharged air temperature and the intake air temperature by a conversion map circuit 240 in accordance with the conversion map stored in the ROM of the microcomputer 22.

Also, at the step 206, the digital value $V_S$ is converted to a desired temperature indicative digital value $T_S$ by a desired preset temperature circuit 241 in accordance with a linear transformation formula. At the step 207, the difference $\Delta T = T_S - T_R$ between the desired temperature $T_S$ and the vehicle compartment temperature $T_R$ is determined.

Then, at the step 208, a PI computation of $X = k \cdot \Delta T + \frac{1}{96} \int \Delta T dt$ is performed by an integrating adder circuit 242.

In this equation, the integral term is obtained by adding the temperature difference $\Delta T$ at intervals of a given time selected by the timer processing at the step 226 of the interrupt routine and then the value of $k \cdot \Delta T$ is added to the integral term thus obtaining the control signal X (the step 209). In the equation, k and $\tau$ are constants which are determined by the control system.

The thus obtained control signal X represents a value corresponding to the heat quantity required by the compartment heat load in the course of controlling the vehicle compartment temperature $T_R$ at the preset temperature $T_S$ and in this embodiment the previously mentioned constants are selected $k > 0$ and $\tau > 0$. Therefore, it means that the compartment heat load requires more heating power as the value of X increases when $X > 0$ and requires more cooling power as the value of $-X$ increases when $X < 0$.

Figure 4:
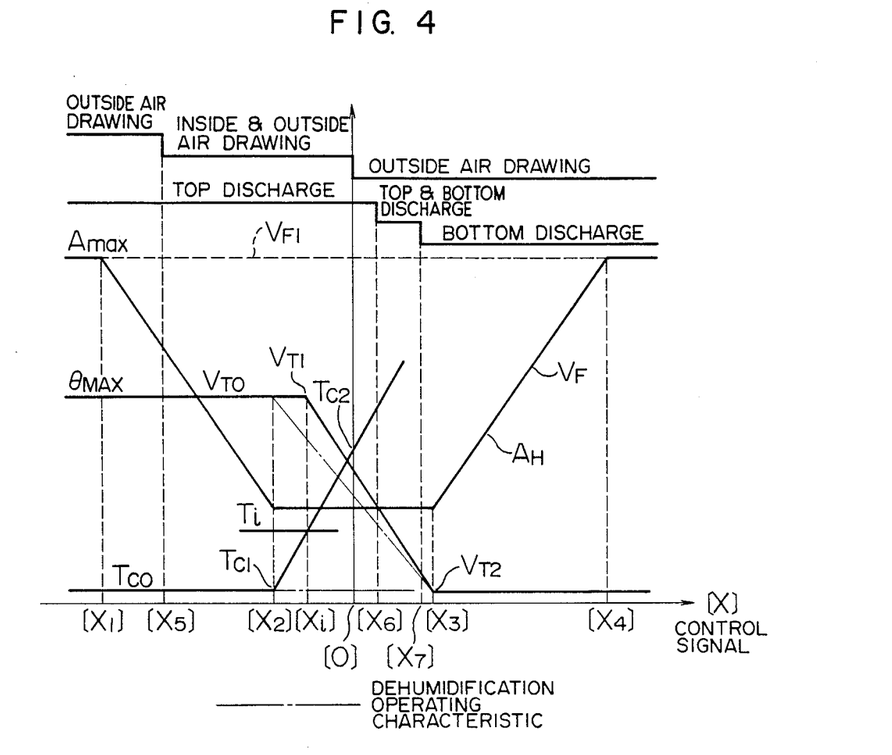
FIG. 4 is a control characteristic diagram of the heat exchanging section in the embodiment of the invention.

The operation of the air conditioner system based on the value of the control signal X will now be described with reference to FIG. 4. FIG. 4 illustrates the manner in which heat exchanging section 1 is operated in accordance with the control signal X which is represented by the abscissa.

At the step 210, the desired discharged air temperature $T_{CO}$ corresponding to the control signal X is determined by a desired discharged air temperature setting circuit 247 in the following manner. More specifically, with respect to a predetermined negative value $X_2$ of X, in the range of $X \leq X_2$ the desired temperature $T_{CO}$ assumes a minimum permissible value $T_{C1}$ (2.5° C. in this embodiment) which is on the verge of freezing the evaporator surface, while in the range of $X \geq X_2$ the desired temperature $T_{CO}$ assumes a value determined by a linear equation connecting a point of the minimum value $T_{C1}$ when $X \geq X_2$ and a point of a given value $T_{C2}$ (25° C. in this embodiment) when $X = 0$.

Then, at the step 211, the desired temperature adjusting door voltage $V_{T0}$ corresponding to the control signal X is determined by the following computations. Firstly, the intake air temperature $T_i$ and the abovementioned mentioned equation would not be uncomfortable are compared so as to obtain as $X_i$ the value of the control signal X corresponding to the value of $T_{CO}$ which is equal to the value of $T_i$. It is assumed that the desired temperature adjusting door voltage $V_{T0}$ is represented by a linear equation in the range between the value $X_i$ and a predetermined value $X_3$ of X so that $V_{T0} = V_{T1}$ is obtained when $X = X_i$ and $V_{T0} = V_{T2}$ is obtained when $X = X_3$. It is to be noted that the value of $V_{T1}$ corresponds to the output voltage of the potentiometer 147 when the passage to the heater core 141 is closed by the temperature adjusting door 142 ($\theta$ is maximum) and the value of $V_{T2}$ corresponds to the output voltage of the potentiometer 147 when the passage to the heater core 141 is opened fully ($\theta = 0$).

Then, at the step 220 of the interrupt routine, the next timer interrupt is enabled. At the next step 221, the contents of the registers which have been used by the main routine are temporarily transferred to other memory, and at the final step 227 these contents are retransferred to the registers thereby preventing any detrimental effect on the execution of the main routine. At the next step 222, the output voltage of the potentiometer 147 is read as a position signal of the temperature adjusting door 142 and then converted to a digital value $V_T$ by the A/D converter 21.

Then, at the step 223, a temperature adjusting door position control circuit 244 compares the desired voltage $V_{T0}$ with the value of $V_T$ to control the position of the temperature adjusting door 142. In other words, the value of $\Delta V_T = V_{T0} - V_T$ is determined to cause control signal generating circuits 245 and 246 to respectively generate a control signal $T_1$ which goes to "1" when $\Delta V_T \geq \Delta V_{TP}$ and goes to "0" when $\Delta V_T < \Delta V_{TP}$ with respect to a predetermined value $\Delta V_{TP} > 0$ and a control signal $T_2$ which goes to "1" when $-\Delta V_{TP} \leq \Delta V_T \leq \Delta V_{TP}$ and goes to "0" in other circumstances. When the control signals $T_1$ and $T_2$ go to "1", the switching elements 233 and 234 are turned on and the electromagnetic valves 145 and 146 are energized. When the control signals $T_1$ and $T_2$ go to "0", the electromagnetic valves 145 and 146 are not energized. In response to these operations, as mentioned previously, the temperature adjusting door 142 is pivoted in the direction tending to increase the illustrated angle $\theta$ in the range $\Delta V_T > \Delta V_{TP}$ and the temperature adjusting door 142 is pivoted in the direction tending to decrease the angle $\theta$ in the range $\Delta V_T < \Delta V_{TP}$. In the range $V_{T0} - \Delta V_{TP} \leq \Delta V_T \leq V_{T0} + \Delta V_{TP}$, the temperature adjusting door 142 is held stationary and its position $\theta$ corresponds to the desired voltage $V_{T0}$.

Then, at the step 215, the desired discharged air temperature $T_{CO}$ and the discharged air temperature $T_C$ are compared to determine the temperature difference $\Delta T_C = T_{CO} - T_C$ and a compressor actuating signal generating circuit 248 is responsive to the temperature difference $\Delta T_C$ to generate a compressor actuating signal C in the following manner. In other words, the actuating signal C goes to "0" when $\Delta T_C \geq 0$ and goes to "1" when $\Delta T_C < 0$.

When the compressor actuating signal C goes to "1", at the time of the step 217 the switching element 35 is turned on and the compressor relay 132b is energized. The compressor relay 132b energizes the electromagnetic clutch 132a so that the compressor 132 is operated and the air flowing through the evaporator 131 is cooled, thereby decreasing the discharged air temperature $T_C$. When the discharged air temperature $T_C$ is decreased, eventually $\Delta T_C \geq 0$ results and the actuating signal C goes to "0". Thus, at the time of the final step 217 of this routine, the compressor 132 is cut out of operation. By cutting the compressor 132 in and out of operation repeatedly in this way, the discharged air temperature $T_C$ is maintained at around the desired temperature $T_{CO}$ determined by the control signal X.

In the range $X \geq X_i$, however, $T_{CO} \geq T_i$ results as mentioned previously. Therefore, even if the cooling means is not operated, $\Delta T_C \geq 0$ results and the compressor 132 is not cut into operation. Thus, $T_C \approx T_i$ results The amount of air supplied to the evaporator 131 and the heater core 141 or the bypass 103 by the blower 121 or the blower air flow A is practically proportional to the voltage $V_F$ supplied to the motor 122. The supply voltage $V_F$ to the motor 122 is controlled in the following way. At the step 216, the desired voltage $V_F$ is first determined in correspondence to the control signal X by a blower air flow computing circuit 249. The desired voltage $V_F$ is controlled in such a manner that with respect to a predetermined negative value $X_1$ and positive value $X_4$ of X, the desired voltage $V_F$ attains a maximum value $V_{F1}$ (12 V in this embodiment) when $X \leq X_1$ and $X \geq X_4$, respectively, and attains a minimum value $V_{F2}$ (4 V in this embodiment) in the range between the negative value $X_2$ and a positive value $X_3$. In the range $X_1 \leq X \leq X_2$, the desired value $V_F$ is determined by a linear equation connecting a point of $V_{F1}$ when $X=X_1$ and a point of $V_{F2}$ when $X=X_2$. In the range $X_3 \leq X \leq X_4$, the desired value $V_F$ is determined by a linear equation connecting a point of $V_{F2}$ when $X=X_3$ and a point of $V_{F1}$ when $X=X_4$.

At the step 217, the thus determined desired value $V_F$ is converted to an analog voltage $V_{FS}$ by the D/A converter 239 and the driver 123 is controlled by the analog voltage $V_{FS}$, thereby operating the motor 122.

Thus, the motor 122 is controlled continuously in such a manner that the blower air flow A attains a maximum value $A_{max}$ when the control signal X is smaller than $X_1$, the blower air flow A is decreased substantially linearly from the maximum value $A_{max}$ to a minimum value $A_{min}$ in the range between $X_1$ and $X_2$, the blower air flow A is maintained at the minimum value $A_{min}$ in the range between $X_2$ and $X_3$, the blower air flow A is increased linearly from the minimum value $A_{min}$ to the maximum value $A_{max}$ in the range between $X_3$ and $X_4$, and the blower air flow A is maintained at the maximum value $A_{max}$ in the range greater than $X_4$.

In addition to these operations, the air inlet door 111 and the mode door 151 are also controlled in the course of the main routine in accordance with the value of the control signal X in the following way.

To control the air inlet door 111, at the step 212, an air inlet door control circuit 250 generates a control signal $I_1$ which goes to "1" when $X \leq 0$ and goes to "0" when $X \geq 0$ and a control signal $I_2$ which goes to "1" when $X \leq X_5$ and goes to "0" when $X \geq X_5$. Here, $X_5$ is a negative value which has a relation $X_1 < X_5 < X_2$.

When the control signals $I_1$ and $I_2$ go to "1", at the step 217, the switching elements 231 and 232 are turned on and the electromagnetic valves 114 and 115 are energized. When the control signals $I_1$ and $I_2$ go to "0", the electromagnetic valves 114 and 115 are not energized.

When the control signal $X \leq X_5$, both of the control signals $I_1$ and $I_2$ go to "1" thereby energizing the electromagnetic valves 114 and 115 and the air inlet door 111 is moved to the inside air supply position by the operation of the actuator 112. When $X \geq 0$, both of the control signals $I_1$ and $I_2$ go to "0" and the air inlet door 111 is pulled into the outside air supply position by the return spring 113.

When $X_5 \leq X \leq 0$, the control signal $I_1$ goes to "1" and the control signal $I_2$ goes to "0", thereby moving the air inlet door 111 into the intermediate position to supply both the inside and outside air.

Similarly, the mode door 151 is also controlled by the control signal X. To control the mode door 151, the values of $X_6$ and $X_7$ are selected such that a top supply mode is selected when the value of X is smaller than $X_6$, a bottom supply mode is selected when $X > X_7$, and both the top and bottom supply modes are selected in the intermediary range between $X_6$ and $X_7$. Also, there is a relation $0 < X_6 < X_7 < X_3$. As regards the actual control signals, at the step 213, a mode door control circuit 251 generates a control signal $O_1$ which goes to "1" when $X < X_7$ and goes to "0" when $X \geq X_7$ and a control signal $O_2$ which goes to "1" when $X < X_6$ and goes to "0" when $X < X_6$.

In accordance with the values of the control signals $O_1$ and $O_2$, the mode door 151 is actuated in the following manner at the step 217.

When $X < X_6$ so that both of the control signals $O_1$ and $O_2$ go to "1", the switching elements 236 and 237 are both turned on and the electromagnetic valves 154 and 155 are both energized. Thus, the mode door 151 is moved into the top supply position by the actuator 152.

When $X > X_7$, both of the control signals $O_1$ and $O_2$ go to "0" so that the electromagnetic valves 154 and 155 are not energized and the mode door 151 is moved into the bottom supply position by the return spring 153.

When $X_6 \leq X \leq X_7$ so that the control signal $O_1$ goes to "1" and the control signal $O_2$ goes to "0", the electromagnetic valve 154 is energized and the electromagnetic valve 155 is deenergized, thereby moving the mode door 151 into the intermediate position to select the top and bottom supply modes.

Figure 5:
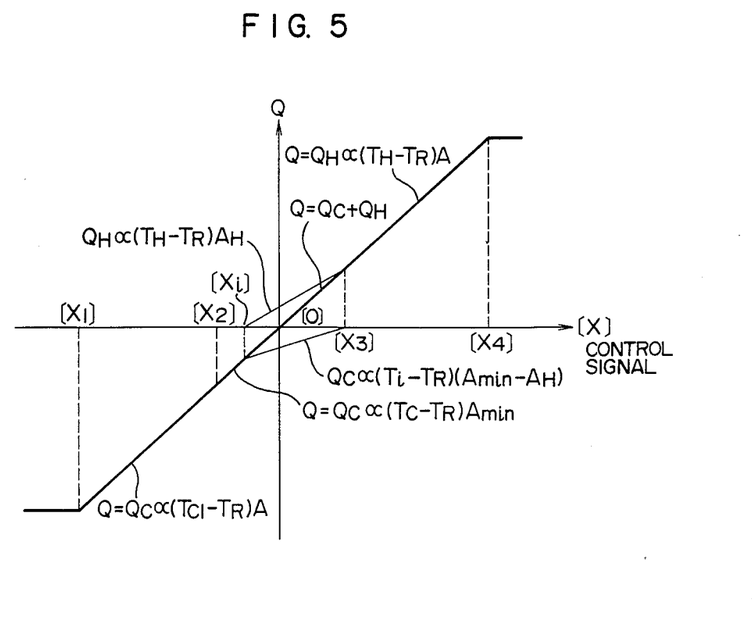
FIG. 5 is a heat radiation characteristic diagram for the embodiment of the invention.

FIG. 5 shows how the radiation heat quantity Q to the vehicle compartment is varied by the abovementioned operations. $X < X_1$ represents the maximum cooling period and $X > X_4$ represents the maximum heating period. Represented by $X_1 < X < X_4$ is the range in which the radiation heat quantity Q is controlled linearly.

The radiation heat quantity Q is the sum of the heat quantity $Q_H$ of the air heated by the heater core 141 and the heat quantity $Q_C$ of the air supplied through the bypass 103 after passing through the evaporator 131.

If $T_H$ represents the temperature of the air just after its passage through the heater core 141 and $A_H$ represents that part of the blower air flow A which flows through the heater core 141, the following relations hold $$Q_H \propto (T_H - T_R) A_H$$

$$Q_C \propto (T_C - T_R)(A - A_H)$$

Firstly, in the range $X_1 \leq X \leq X_2, A_H = 0$ so that $Q_H = 0$ and $(T_C - T_R) = (T_{C1} - T_R)$. The latter is a negative constant value and the value of A varies linearly with X. Thus, $Q = Q_C$ decreases as the cooling power from the maximum cooling power proportionately with increase in the value of X (decrease in the absolute value).

In the range $X_2 \leq X \leq X_i, Q_H = 0$ and $Q = Q_C \propto (T_C - T_R) A_{min}$ still result and the value of $A_{min}$ is constant. Since $(T_C - T_R)$ varies linearly from $(T_{C1} - T_R)$ to $(T_i - T_R)$ with increase in the value of X (decrease in the absolute value), the value of Q decreases as the cooling power proportionately with increase in the value of X. Then, in the range $X_i \leq X \leq X_3$, the intake air temperature $T_i$ is lower than the desired discharged air temperature $T_{CO}$ and therefore the cooling means or the compressor 132 is not operated.

Therefore $T_C = T_i$ results with the following $$Q = Q_H + Q_C$$

$$Q_C \propto (T_i - T_R)(A_{min} - A_H)$$

$$Q_H \propto (T_H - T_R) A_H$$

Thus, $Q_C \propto (T_i - T_R) A_{min} + (T_H - T_i) A_H$. Since $(T_i - T_R)$ is a negative constant and $A_{min}$ is also a constant, $(T_i - T_R) A_{min}$ is a negative constant and $(T_H - T_i)$ is a positive constant. In this case, the heating capacity of the heater core 141 is sufficiently large and therefore the value of $T_H$ is maintained constant. Also, the value of $A_H$ varies linearly from 0 when $X = X_i$ up to 100% of A or $A_{min}$ when $X = X_3$ and thus the value of Q increases proportionately as the value of X increases from $X_i$ to $X_3$.

In the range $X_3 \leq X \leq X_4$, $A_H = A$ and hence $Q = Q_H \propto (T_H - T_R)A$. Since $(T_H - T_R)$ is constant and the value of A varies linearly with X, the value of Q increases proportionately with increase in the value of X.

The range $X \geq X_4$ represents the maximum heating condition. As described hereinabove, the radiation heat quantity to the vehicle compartment (the negative quantity is the cooling power to remove the heat from the vehicle compartment air) is monotonically continuously controlled in accordance with the control signal X.

Figure 6:
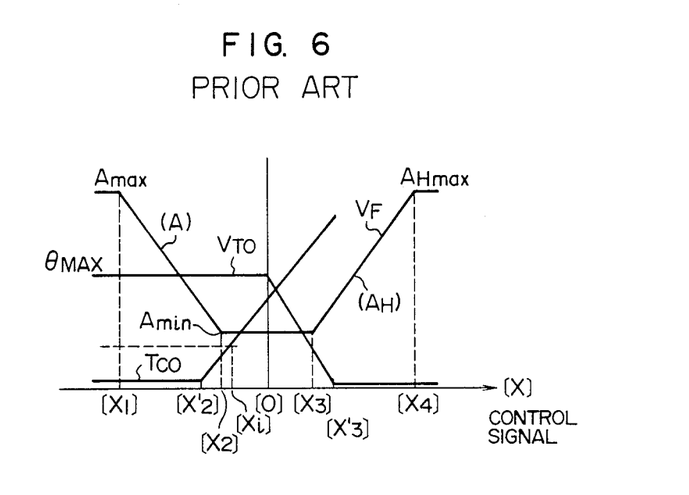
FIGS. 6 and 7 are respectively a control characteristic diagram and heat radiation characteristic diagram for the heat exchanging section of the conventional air conditioner system (Unexamined Publication No. 58-156410).
Figure 7:
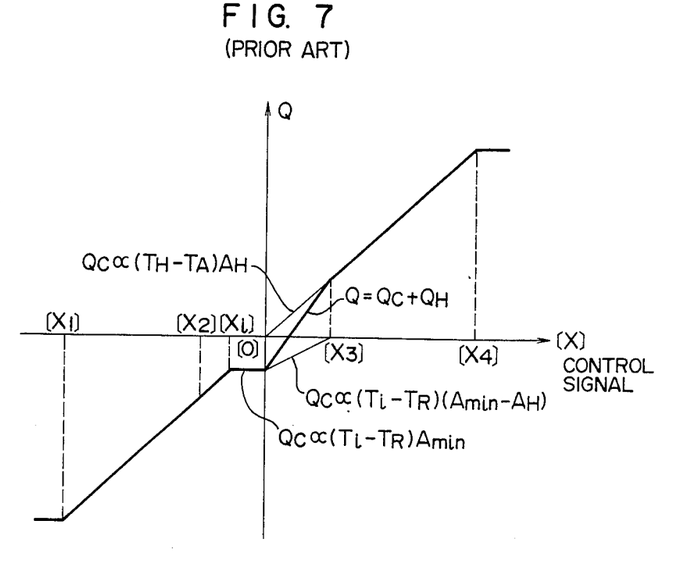

Referring to FIGS. 6 and 7 relating to the air conditioner system disclosed in the previously mentioned Japanese Unexamined Publication No. 58-156410, there are illustrated characteristic diagrams corresponding to the above-mentioned FIGS. 4 and 5 for the embodiment of this invention. In FIG. 4 of this invention, the intake air temperature $T_i$ is detected such that the angle $\theta$ of the door 142 starts decreasing after the time of $X_i$ at which the intake air temperature $T_i$ becomes equal to the desired discharged air temperature $T_{CO}$. In other words, when the value of $T_i$ approaches the value of $T_{CO}$ from the low temperature side, it means that practically the operation of the evaporator 131 is not required, and in the condition $T_{CO} \geq T_i$ the closing of the door 142 (decrease in $\theta$) is started so as to utilize the difference between the two temperatures for the heating by the heater core 141.

In the case of FIG. 6 relating to the prior art system, however, there is no means for detecting the intake air temperature $T_i$ and therefore it is impossible to detect the time at which the intake air temperature comes close to the desired discharged air temperature. Therefore, the door 141 still continues to close the passage to the heater core 141 (the angle $\theta$ is maximum) even after the intake air temperature has become practically equal to the desired discharged air temperature before reaching the time at which the door 141 starts closing in FIG. 6 (the time of X=0 in FIG. 6). In other words, the control of the radiation heat quantity Q in the air conditioner system is not effected smoothly as in the case of this invention. This is also apparent from the characteristic diagram shown in FIG. 7. In other words, the value of Q is held constant at $Q = Q_C \propto (T_i - T_R)A_{min}$ in the range $X_i \leq X \leq 0$ and the value of Q increases in the range $0 \leq X \leq X_3$.

More specifically, when $T_i < T_{C2}$, the value of Q does not monotonically continuously increase with X but increases with steps. This has been the cause of deterioration in the convergence of the automatic temperature control described in connection with FIG. 2 in the vicinity of $X_i \leq X \leq X_3$. In the case of FIG. 2, the control constants, etc., of the controller 2 have been preset on the assumption that the radiation heat quantity control is effected monotonically continuously in accordance with the control signal X and the presence of such steps ruins this assumption.

On the other hand, an examination of the air conditioner system disclosed in U.S. Pat. No. 4416324 shows that while an energy saving effect is obtained due to the fact that the heating means does not function when the discharged air temperature of the cooling means is lower than the upper level, the cooling means operates in such a manner that the discharged air temperature attains the upper level even in conditions where the heating means is caused to function. Therefore, this prior art system still leaves room for improvement in energy saving as compared with the embodiment of this invention.

A dehumidifying function used in the rainy season, etc., will now be described.

In response to the dehumidification command signal $V_{VDEH}$ from the dehumidification switch 32 of the operating section 3, the dehumidification mode is read at the manual switch read step 225 of the microcomputer interrupt routine (FIG. 3).

At the dehumidification switch timer processing step 226, the desired discharged air temperature $T_{CO}$ at the main routine step 214 is maintained at the permissible minimum temperature $TC_1$ as shown by the dot-and-dash line in FIG. 4 for a period of time determined by a timer 244 (e.g., 10 minutes in this embodiment), thereby maintaining the temperature $T_C$ of the air just after its passage through the evaporator 131 at the permissible minimum temperature $T_{C1}$ (25° C. in this embodiment). Also, the characteristic of the temperature adjusting door 142 is changed to assume as if $T_i = T_{C1}$.

In this condition, the air passing through the evaporator 131 is simultaneously cooled and dehumidified and then supplied into the vehicle compartment. However, the characteristic of FIG. 5 remains unchanged except the shifting of $X_i$ to $X_2$. This condition is the same with the conventional reheat air mixing type such as disclosed in the previously mentioned Japanese Unexamined Publication No. 55-36166 and the energy saving effect incorporated in Unexamined Publication No. 58-156410 is ruined.

A windshield air supply operation for blowing the discharged air to the windshield glass of the vehicle from the air discharge outlet 106 for the front windshield glass will now be described.

In response to the windshield air supply command signal $V_{DEF}$ from the switch 33 of the operating section 3, the operating mode of the windshield glass is read at the step 225 of the interrupt routine. When the windshield air supply mode is established, the control signal D from a flip-flop 252 is changed to "1" at the step 213 of the main routine so that at the step 217, the switching element 238 is turned on and the electromagnetic valve 159 is energized, thereby actuating the air discharge outlet changeover door 156 by the vacuum actuator 157. The windshield air supply operation for blowing the air from the defroster outlet 106 can be released by operating the switch 33 again.

The basic construction of the embodiment for starting the opening of the temperature adjusting door 142 at the point of $X_i$ of the control signal X has been described hereinabove. However, this is not always necessary and it is possible to arrange so that the opening of the door 142 is started at around the point of $X_i$. In this case, there is the possibility of both the cooling means and the heating coming into operation in this limited range.

However, if the range is limited suitably, there is no danger of the intended energy saving effect of the system being reduced considerably and also there is no danger of ruining the monotonic continuity of the temperature control.

Figure 8:
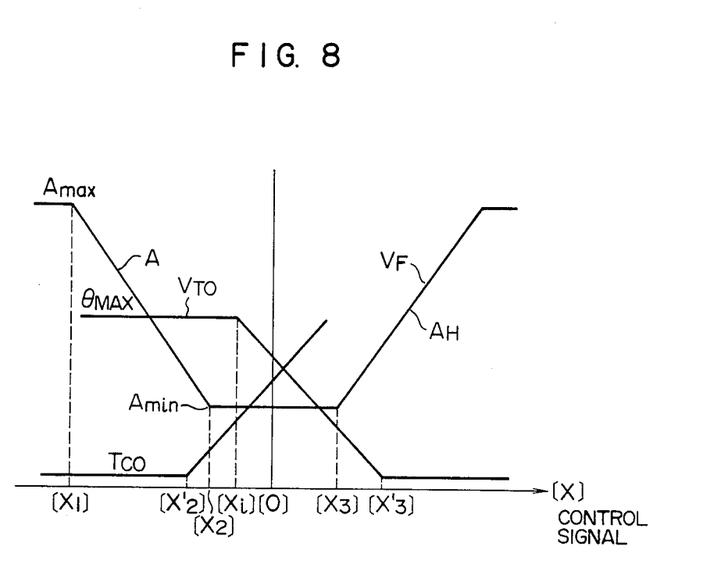
FIG. 8 is a control characteristic diagram for the heat exchanging section in another embodiment of the invention.

Referring now to FIG. 8, there is illustrated a characteristic diagram of another embodiment of the invention and this characteristic diagram corresponds to the previously mentioned FIG. 4. FIG. 8 shows only the difference from FIG. 4.

FIG. 8 differs from FIG. 4 only in that the lower change points of the desired discharged air temperature $T_{C0}$ and the desired temperature adjusting door position $V_{T0}$ are respectively shifted from $X_2$ and $X_3$ to $X_{2'}$ and $X_{3'}$. It will be apparent from the qualitative point of view without any detailed explanation that this change has no detrimental effect on the monotonic continuous increasing characteristic of the radiation heat quantity Q in accordance with the control signal X.

As shown by the characteristic diagram of FIG. 5, if the discharged air temperature is dropped to the minimum temperature $T_{C1}$ while holding the blower air flow A at the minimum value $A_{min}$, a light current of cooled air is blown toward the knees of the occupants thus tending to cause a feeling of discomfort. Therefore, the air flow is increased slightly before the discharged air temperature is dropped to the minimum value (i.e., the discharged air temperature is decreased to the minimum at the time of $X_{2'}$) In addition, if all the hot air is blown from the bottom discharge outlet while maintaining the blower air flow A at $A_{min}$, only the feet of the occupants are warmed thus tending to cause a feeling of discomfort. Therefore, the air flow is increased starting at the time of $X_3$ preceding the time of $X_{3'}$ at which the maximum air temperature is attained.

The foregoing description premises the use of the intake air sensor 165 as a means of detecting the intake air temperature of the evaporator 131.

Figure 9:
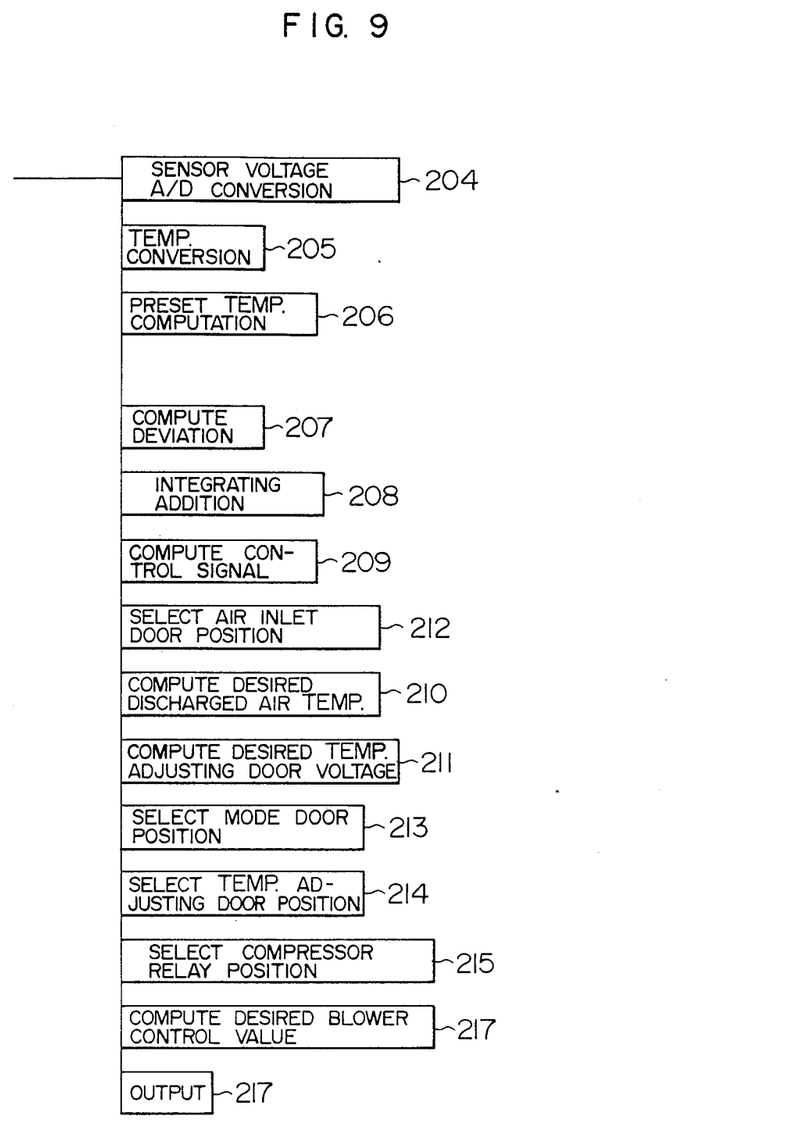
FIG. 9 is a flow chart for explaining the operation of another embodiment of the invention.

However, the intake air temperature $T_i$ can be detected without especially mounting such an intake air temperature sensor in the manner which will be described hereunder. While no description has been made since the foregoing description has not required it, generally the outside air temperature sensor (designated at 180 in FIG. 1) is mounted at the suitable position outside the vehicle compartment as a low temperature protective measure for the cooling unit, and a method of computing the intake air temperature $T_i$ as well as the sensor output signal by computer calculations will be described first. The sensor 180 comprises a thermistor or the like and the detected outside air temperature $T_A$ is applied in the form of a voltage $V_A$ (FIG. 1) to the controller 2. The main routine of the microcomputer operational flow chart for this case is shown in FIG. 9. This is the same as the main routine of FIG. 3 except that the air inlet door operation decision step is arranged above the desired discharged air temperature computing step 210.

The temperature of the air supplied to the evaporator 131 is determined in accordance with the previously mentioned various data including the outside air temperature $T_A$, the vehicle compartment temperature $T_R$ and the air inlet door control signals $I_1$ and $I_2$ in the following way.

① $T_i = T_R$ when both of $I_1$ and $I_2$ go to "1".

② $T_i = T_A$ when both of $I_1$ and $I_2$ go to "0".

③ $T_i = C \cdot T_R + (1 - C)T_A$ when $I_1$ goes to "1" and $I_2$ goes to "0".

Here, C is a coefficient indicating the ratio of the amount of air supplied from the inside air inlet 101 to the total amount of air supplied from both of the outside air inlet 101 and the inside air inlet 101 and it has a given value depending on the construction of the heat exchanging section 1.

Thus, in this case there is no need to use any exclusive sensor for detecting the intake air temperature $T_i$, thereby correspondingly reducing the cost and simplifying the construction.

The intake air temperature $T_i$ may be detected in The following way. More specifically, an average value $\overline{T_C}$ over a given time of a digital value $T_C$ corresponding to the temperature $T_C$ detected by the discharged air temperature sensor 160 is obtained and this average value $\overline{T_C}$ is compared with the desired discharged air temperature $T_{C0}$ for the then current control signal X, thereby determining the intake air temperature as $T_i = \overline{T_C}$ when $\overline{T_C} < T_{C0}$. In other words, when there is the condition $\overline{T_C} < T_{C0}$, the cooling function of the evaporator 131 should have been stopped as mentioned previously so that the temperature change of the air passed through the evaporator 131 is reduced to zero and therefore $T_i = T_C$ holds.

Then, when $T_C \leq T_{C0}$, there is the condition $X \leq X_i$ as mentioned previously so that there is no need to calculate the value of $V_{T0}$ and it is necessary to simply set $V_{T0} = VT_1$.

Thus, also in this case, there is no need to use any intake air temperature sensor with the resulting reduction in cost and simplification in construction.

In the above described embodiments, the compressor is subjected to the on-off control or the duty cycle control for controlling the discharged air temperature $T_C$ at the desired temperature $T_{C0}$. However, the invention is not limited to the duty cycle control and a variable displacement type compressor may be used.

From the foregoing description it will be seen that in accordance with the invention the intake air temperature is taken into consideration to control the amount of radiation heat to the vehicle compartment, with the result that a stable temperature control is effected with a stable adjusting performance throughout the control range requiring the air conditioning, thereby easily ensuring comfortable air conditioning. Also, the detection of the intake air temperature does not necessarily require the additional installation of any intake air temperature sensor and it can be detected by calculation from the output signal of the existing sensor. This has the effect of reducing the cost and simplifying the construction as compared with the addition of an intake air temperature sensor.

We claim:

1. An air conditioner system for an automotive vehicle comprising:
  housing means having intake means for taking in air and said housing means defining air passage means extending through said air conditioner system from said intake means;
  a blower for taking in air through said intake means and moving it through said air passage means;
  air cooling means located in said air passage means;
  air heating means located in said air passage means;
  cooling control means for detecting a temperature of discharged air from said air cooling means immediately after passage therethrough to control said air cooling means in a manner that said detected discharged air temperature is adjusted to a desired discharge air temperature;
  means for bypassing air around said air heating means said bypassing means including an air distributing door for adjusting a proportion of an intake air supplied to said air heating means to an intake air supplied by said blower;

means for detecting the temperature of intake air immediately before passage through said air cooling means; and heat exchange rate control means for establishing said desired discharged air temperature and operating said air cooling and heating means and said cooling control means to control a rate of heat exchange between said intake air and said air cooling and heating means to reduce said proportion of intake air supplied to said air heating means to a minimum when said desired discharged air temperature is lower than a predetermined value and to increase said proportion of intake air supplied to said air heating means responsive to said desired discharge air temperature becoming higher than said predetermined value, wherein said predetermined value of said discharged air temperature is substantially equal to a temperature of said intake air detected by said intake air temperature detecting means immediately before passage through said air cooling means; and wherein said air cooling means is not actuated by said control means when said intake air temperature is smaller than said desired discharged air temperature and said air cooling means is actuated when said intake air temperature is larger than said desired discharged air temperature.

2. A system according to claim 1, wherein said intake air temperature detecting means comprises a temperature sensor arranged immediately upstream of said air cooling means.

3. An air conditioner system for an automotive vehicle comprising:

housing means having intake means for taking in air and said housing means defining air passage means extending through said air conditioner system from said intake means;

a blower for taking in air through said intake means and moving it through said air passage means;

air cooling means located in said passage means;

air heating means located in said passage means;

cooling control means for detecting a temperature of discharged air from said air cooling means immediately after passage therethrough to control said air cooling means in a manner that said detected discharged air temperature is adjusted to a desired discharge air temperature;

means for bypassing air around said air heating means, said bypassing means including an air distributing door for adjusting a proportion of an intake air supplied to said air heating means to an intake air supplied by said blower;

means for detecting the temperature of intake air immediately before passage through said air cooling means; and heat exchange rate control means for establishing said desired discharged air temperature and operating said air cooling and heating means and said cooling control means to control a rate of heat exchange between said intake air and said air cooling and heating means to reduce said proportion of intake air supplied to said air heating means to a minimum when said desired discharged air temperature is lower than a predetermined value, wherein said predetermined value of said discharged air temperature is substantially equal to a temperature of said intake air detected by said intake air temperature detecting means immediately before passage through said air cooling means;

wherein said cooling means is not actuated by said control means when said intake air temperature is smaller than said desired discharged air temperature and said air cooling means is actuated when said intake air temperature is larger than said desired discharged air temperature; and wherein said intake air temperature detecting means detects said intake air temperature by performing computational operations on output signals from means for detecting a temperature of air outside of said vehicle, means for detecting a temperature of air in said vehicle and means for detecting an inside-outside air ratio of air drawn from the inside and outside of said vehicle.

4. An air conditioner system for an automotive vehicle comprising:

housing means having intake means for taking in air and said housing means defining air passage means extending through said air conditioner system from said intake means;

a blower for taking in air through said intake means and moving it through said air passage means;

air cooling means located in said air passage means;

air heating means located in said air passage means;

cooling control means for detecting a temperature of discharged air from said air cooling means immediately after passage therethrough to control said air cooling means in a manner that said detected discharged air temperature is adjusted to a desired discharge air temperature;

means for bypassing air around said air heating means, said bypassing means including an air distributing door for adjusting a proportion of an intake air supplied to said air heating means to an intake air supplied by said blower;

means for detecting the temperature of intake air immediately before passage through said air cooling means; and heat exchange rate control means for establishing said desired discharged air temperature and operating said air cooling and heating means and said cooling control means to control a rate of heat exchange between said intake air and said air cooling and heating means to reduce said proportion of intake air supplied to said air heating means to a minimum when said desired discharged air temperature is lower than a predetermined value;

wherein said predetermined value of said discharged air temperature is substantially equal to a temperature of said intake air detected by said intake air temperature detecting means immediately before passage through said air cooling means;

wherein said air cooling means is not actuated by said control means when said intake air temperature is smaller than said desired discharged air temperature and said air cooling means is actuated when said intake air temperature is larger than said desired discharged air temperature; and wherein said intake air temperature detecting means computes and average value of said discharged air temperature over a predetermined period of time whereby said average value is considered as said intake air temperature when said average value is lower than said desired discharge air temperature.

* * * * *